(12) United States Patent
Poudrier

(10) Patent No.: US 9,404,021 B2
(45) Date of Patent: Aug. 2, 2016

(54) PRESSURE SENSITIVE ADHESIVE WAXED CLOTH TAPE METHOD OF MANUFACTURE AND USE

(71) Applicant: Hayden Poudrier, Surrey (CA)

(72) Inventor: Hayden Poudrier, Surrey (CA)

(*) Notice: Subject to any disclaimer, the term of this patent is extended or adjusted under 35 U.S.C. 154(b) by 0 days.

(21) Appl. No.: 14/692,698

(22) Filed: Apr. 21, 2015

(65) Prior Publication Data

US 2015/0232708 A1    Aug. 20, 2015

Related U.S. Application Data

(63) Continuation-in-part of application No. 14/114,468, filed on Oct. 28, 2013, now abandoned.

(51) Int. Cl.
| | | |
|---|---|---|
| *C09J 7/04* | (2006.01) | |
| *B05D 1/28* | (2006.01) | |
| *D06M 15/705* | (2006.01) | |
| *D06M 15/71* | (2006.01) | |
| *C09J 7/02* | (2006.01) | |
| *B05C 1/04* | (2006.01) | |

(52) U.S. Cl.
CPC .............. *C09J 7/048* (2013.01); *C09J 7/0296* (2013.01); *D06M 15/705* (2013.01); *D06M 15/71* (2013.01); *A63B 59/70* (2015.10); *A63B 2102/24* (2015.10); *B05C 1/04* (2013.01); *B05D 1/28* (2013.01); *C09J 2201/606* (2013.01); *C09J 2400/263* (2013.01); *C09J 2401/006* (2013.01); *C09J 2421/00* (2013.01); *C09J 2467/006* (2013.01); *C09J 2491/006* (2013.01)

(58) Field of Classification Search
CPC ...... C09J 7/045; C09J 7/048; C09J 2491/006; B05C 1/04; B05C 1/08–1/12; B05D 1/28; A63B 59/70; A63B 2102/24
USPC ........................................................ 427/363
See application file for complete search history.

(56) References Cited

U.S. PATENT DOCUMENTS

| | | | | |
|---|---|---|---|---|
| 2,373,634 A | * | 4/1945 | Wagner ..................... | C09J 7/045 206/813 |
| 2009/0155601 A1 | * | 6/2009 | Lavature ..................... | C09J 4/06 428/424.2 |

* cited by examiner

*Primary Examiner* — Carson Gross
(74) *Attorney, Agent, or Firm* — Stephen R. Burri

(57) ABSTRACT

A method of manufacturing a pressure sensitive adhesive waxed cloth tape comprising a fabric substrate having an adhesive layer infused on one surface and a wax layer infused on an opposing second surface, the wax layer including a tackifier resin. The pressure sensitive adhesive waxed cloth tape may be used to prevent buildup of snow and ice on a hockey stick blade during exposure to moisture, cold temperatures, snow, ice, and other harsh conditions. The tape will easily adhere to itself when in a rolled position prior to use or when overlapped on the stick blade while in use.

9 Claims, 2 Drawing Sheets

PRESSURE SENSITIVE ADHESIVE WAXED CLOTH TAPE METHOD OF MANUFACTURE AND USE

FIELD OF THE INVENTION

The present invention relates to cloth tapes. In particular, the present invention relates to pressure sensitive adhesive waxed cloth tapes for use in ice hockey.

BACKGROUND OF THE INVENTION

It is known to provide cloth-based tapes for use in protecting hockey stick blades and improving player puck control by increasing friction between the puck and the blade. Such prior art tapes are designed for increased friction, and are not intended for nor effective as a blade tape for preventing snow and ice buildup of ice hockey stick blades. A disadvantage of such prior art tapes is the absence of any component to protect the cloth from the outside elements it may come into contact with during sporting activities. Exposure of the tape to such elements, including water, snow, ice, and cold reduces the durability of the tape, as well as reducing its adhesive properties. The device of the present invention addresses these shortcomings in the prior art by providing an improved cloth tape which is more resilient to these environmental factors, while providing water repellence to prevent snow and ice buildup.

BRIEF DESCRIPTION OF THE DRAWINGS

A detailed description of the preferred embodiments is provided by way of example only and with reference to the following drawings, in which.

Figure 1:
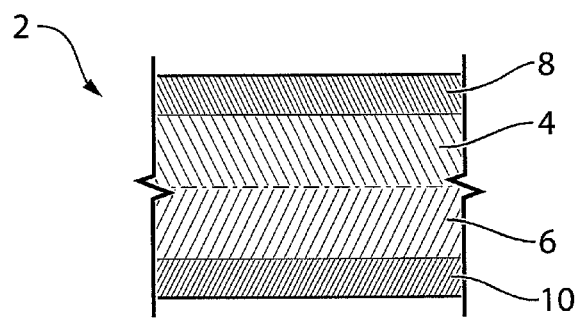
FIG. 1 is a cross-sectional view of the pressure sensitive adhesive waxed cloth tape of the present invention.

In the drawings, one embodiment of the invention is illustrated by way of example. It is to be expressly understood that the description and drawings are only for the purpose of illustration and as an aid to understanding, which are not intended as a definition of the limits of the invention.

SUMMARY OF THE INVENTION

There is provided a pressure sensitive adhesive waxed cloth tape comprising a fabric substrate having first and second opposing surfaces, a pressure sensitive adhesive infusion layer applied to the first surface, and a wax infusion layer applied to the second surface. The fabric substrate may be manufactured of a fabric selected from the group of fabrics comprising cotton, polyester, cotton-polyester blend, rayon, nylon, acrylic, flax, hemp, and bamboo.

The wax infusion layer may be a mixture of wax and a tackifier resin. The tackifier resin may be selected from the group of tackifier resins comprising rosins, rosin derivatives, terpenes, modified terpenes, aliphatic resins, cycloaliphatic resins, aromatic resins, hydrogenated hydrocarbon resins, and terpene-phenol resins. The adhesive is a pressure-sensitive adhesive.

The pressure sensitive adhesive waxed cloth tape may have a thickness of between 0.05 and 1.0 mm. The tape substrate may have a thickness of between 0.001 and 0.75 mm. The pressure sensitive adhesive layer may have a thickness of between 0.001 and 0.5 mm. The wax layer may have a thickness of between 0.001 and 0.5 mm.

There is further provided a method of manufacturing a pressure sensitive adhesive waxed cloth tape, comprising the steps of passing the tape through a calender machine to allow a pressure sensitive adhesive to be absorbed into a first surface of the tape to a desired depth; allowing the pressure sensitive adhesive infused tape to dry; passing the tape through a wax applicator to allow a wax to be absorbed into a second opposing surface of the tape to a desired depth; and allowing the pressure sensitive adhesive and wax infused tape to dry.

There is further provided a method of use of the pressure sensitive adhesive waxed cloth tape of the invention for wrapping around the blade of an ice hockey stick, and a method of preventing ice and snow buildup on a hockey stick blade comprising wrapping overlapping layers of the described pressure sensitive adhesive waxed cloth tape around the stick blade.

DETAILED DESCRIPTION OF THE INVENTION

There is provided a pressure sensitive adhesive waxed cloth tape for use by athletes and others participating in ice hockey activities. In such activities, the user is required to control a puck using the blade of an ice hockey stick. It is essential that the user be able to control the direction of the puck coming off the stick blade. This control is reduced by the buildup of snow and ice to which the blade is exposed during play. The present invention provides a pressure sensitive adhesive waxed cloth tape which prevents water absorption into the tape, thereby preventing snow and ice buildup on the ice hockey stick blade. Whereas prior art cloth tapes will have reduced effectiveness in the wet, snowy and icy environment the blade comes into contact with during hockey, the present invention is well suited to this environment.

As depicted in FIG. 1, the device of the present invention is a cloth tape 2 infused on a first side with a wax 4, and infused on a second opposing side with a pressure sensitive adhesive 6. The wax may also form an external wax layer 8 on the first side, and the pressure sensitive adhesive an external adhesive layer 10 on the second side. Preferably, the cloth is manufactured of cotton, or a cotton-polyester blend, although other fabrics and materials are within the scope of the invention. Preferably, the adhesive is a rubber-based pressure sensitive adhesive. Use of other adhesive materials is also within the scope of the invention as they will also provide the required adhesive bond.

Preferably, the cloth will be deeply infused with the wax, to at least half its thickness, and an external layer of wax of between 0.001 mm and 0.5 mm is applied to the outer side of the tape. Infusion of the wax permits the wax to have a stronger bond to the cloth tape, preventing flaking of the wax from the cloth. By infusing the wax into the cloth, the pressure sensitive adhesive waxed cloth tape presents a strong lower pressure sensitive adhesive surface to apply to the object being taped, or to another layer of tape when rolled or when the pressure sensitive adhesive waxed cloth tape overlaps itself on the object.

In a preferred embodiment of the present invention, a microcrystalline wax is infused into the cloth tape. Microcrystalline waxes are adhesive, soft and flexible. Microcrystalline wax provides a stronger bond due to a higher resiliency, flexibility and a finer crystal structure than other waxes such as paraffin. Microcrystalline waxes remain tacky at the temperatures experienced during ice hockey conditions, which allows the pressure sensitive adhesive waxed cloth tape to adhere well to itself.

It should be noted, however, that other waxes, as they also repel ice and water, are understood to be within the scope of the invention. According to various embodiments of the invention, numerous different types of waxes may be used singly or in combination, including beeswax, bayberry, candelilla, carnauba, castor, esparto, ouricury, rice bran, soy, ceresin, montan, peat, paraffin, microcrystalline, polyethylene, and Fischer-Tropsch waxes.

In one embodiment, a tackifier resin or adhesive may be used as an additive to the wax infusion to increase the adhesive properties of the outer surface of the pressure sensitive adhesive waxed cloth tape. When the pressure sensitive adhesive waxed cloth tape is rolled prior to use, or overlapped when in use, this increased adhesion permits the pressure sensitive adhesive waxed cloth tape to remain in place on the tape roll prior to use, or when in use wrapped around the blade of a hockey stick.

Examples of tackifier resins which may be added to the wax may include rosins and derivatives, terpenes and modified terpenes, aliphatic resins, cycloaliphatic resins, and aromatic resins, hydrogenated hydrocarbon resins, and terpene-phenol resins. In a preferred embodiment, MICROSERE® 5792 (a trademark of The International Group, Inc.), a wax containing a tackifier resin, is used as the wax layer of the invention.

In a preferred embodiment, a desired fragrance may be incorporated into the wax for aesthetic reasons.

Figure 2:
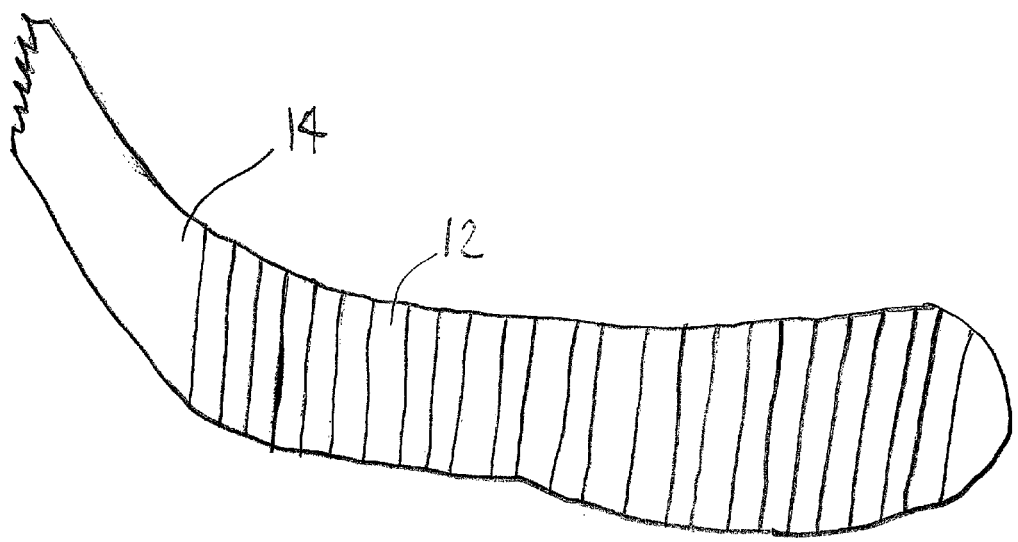
FIG. 2 is a perspective view of the pressure sensitive adhesive waxed cloth tape of the present invention wrapped around a hockey stick blade, according to one embodiment of the invention.

In operation, the pressure sensitive adhesive waxed cloth tape of the present invention may be used primarily by hockey players, for increasing their puck control and for protection of their hockey stick. Infusion of wax into the cloth base of the pressure sensitive adhesive waxed cloth tape creates a barrier between the cloth and the elements it may come into contact with, such as ice, snow, and water. FIG. 2 depicts the pressure sensitive adhesive waxed cloth tape 12 of the present invention wrapped around a hockey stick blade 14.

Figure 3:
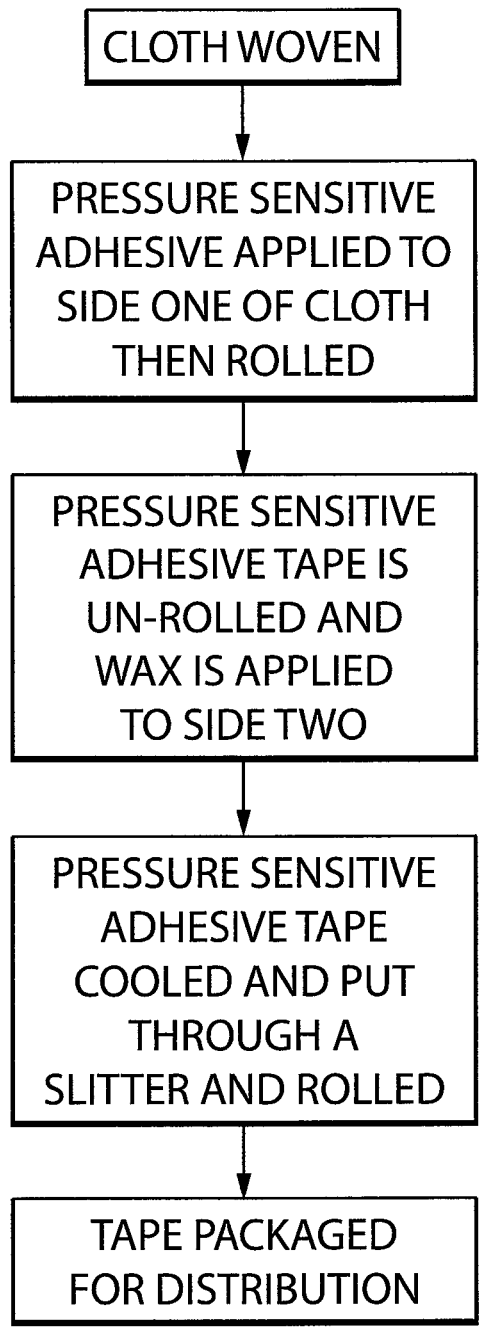
FIG. 3 is a schematic showing the method of preparation of the pressure sensitive adhesive waxed cloth tape of the present invention.

In a preferred embodiment of the method of the invention as depicted schematically in FIG. 3, a cloth substrate is sent through a series of rollers in a calender machine. First a pressure sensitive adhesive is applied to a first side of the cloth substrate and the cloth substrate is rolled. This process results in a strong bond between the cloth substrate and the adhesive. Next, the resulting pressure sensitive adhesive cloth tape is unrolled and a wax is applied to a second side by running the cloth tape through a wax applicator. The wax is infused into the cloth in a molten form to ensure complete infusion resulting in an effective product.

The pressure sensitive adhesive waxed cloth tape is re-rolled, cooled, then unrolled and run through a slitter, and rolled again prior to packaging for distribution. While in the preferred embodiment the pressure sensitive adhesive is applied prior to the wax, it is also within the scope of the invention to apply the wax prior to applying the pressure sensitive adhesive.

The wax infusion also protects the bond between the pressure sensitive adhesive and the object to which the pressure sensitive adhesive waxed cloth tape has been applied. The wax functions as a sealant which prevents the pressure sensitive adhesive waxed cloth tape from drying out and losing its adhesive properties. The present invention helps to eliminate water, snow and ice build-up on equipment, which may occur while playing hockey. Such build-up presents a problem in hockey as the resulting irregular surfaces on the equipment caused by ice and snow negatively affects athlete performance. A further benefit of the wax infusion is added durability as a result of the barrier created between the cloth pressure sensitive adhesive waxed cloth tape and the snow, ice, water, or other elements that the pressure sensitive adhesive waxed cloth tape may come into contact with.

It will be appreciated by those skilled in the art that other variations of the preferred embodiment may also be practiced without departing from the scope of the invention.

The invention claimed is:

1. A method of manufacturing a pressure sensitive adhesive waxed cloth tape, comprising the steps of:
   a. absorbing a desired depth of pressure sensitive adhesive into a first surface of the tape by running the tape through a Calender machine;
   b. allowing the pressure sensitive adhesive infused tape to dry;
   c. absorbing a desired depth of wax into a second surface of the tape by running the tape through a wax applicator;
   d. allowing the pressure sensitive adhesive and wax infused tape to dry;
   e. rolling and cooling the tape; and
   f. unrolling the tape and passing it through a slitter.

2. The method of claim 1, further comprising after step (a) the additional step (a.1) of applying a layer of pressure sensitive adhesive on the first surface to a desired thickness.

3. The method of claim 1, further comprising after step (c) the additional step (c.1) of applying a layer of wax on the second surface to a desired thickness.

4. The method of claim 3, wherein the wax comprises a mixture of wax and tackifier resin.

5. The method of claim 4, wherein the wax comprises one or more waxes selected from the group of waxes consisting of beeswax, bayberry, candelilla, carnauba, castor, esparto, ouricury, rice bran, soy, ceresin, montan, peat, paraffin, microcrystalline, polyethylene, and Fischer-Tropsch waxes.

6. The method of claim 4, where the tackifier resin is selected from the group of tackifier resins consisting of rosins, rosin derivatives, terpenes, modified terpenes, aliphatic resins, cycloaliphatic resins, aromatic resins, hydrogenated hydrocarbon resins, and terpene-phenol resins.

7. The method of claim 2, further comprising after step (c) the additional step (c.1) of applying a layer of wax and tackifier resin on the second surface to a desired thickness.

8. The method of claim 7, wherein the wax comprises one or more waxes selected from the group of waxes consisting of beeswax, bayberry, candelilla, carnauba, castor, esparto, ouricury, rice bran, soy, ceresin, montan, peat, paraffin, microcrystalline, polyethylene, and Fischer-Tropsch waxes.

9. The method of claim 7, where the tackifier resin is selected from the group of tackifier resins consisting of rosins, rosin derivatives, terpenes, modified terpenes, aliphatic resins, cycloaliphatic resins, aromatic resins, hydrogenated hydrocarbon resins, and terpene-phenol resins.

* * * * *